US006644163B2

(12) United States Patent
Lee

(10) Patent No.: US 6,644,163 B2
(45) Date of Patent: Nov. 11, 2003

(54) APPARATUS FOR ADJUSTING THE WORKTABLE OF THE BAND SAWING MACHINE

(75) Inventor: Lien-Chu Lee, Taichung Hsien (TW)

(73) Assignee: OAV Equipment & Tools, Inc., Taichung Hsien (TW)

( * ) Notice: Subject to any disclaimer, the term of this patent is extended or adjusted under 35 U.S.C. 154(b) by 171 days.

(21) Appl. No.: 09/966,110

(22) Filed: Oct. 1, 2001

(65) Prior Publication Data

US 2003/0061928 A1 Apr. 3, 2003

(51) Int. Cl.⁷ .............................. B26D 1/46; B27B 13/00
(52) U.S. Cl. ............................. 83/810; 83/802; 83/581
(58) Field of Search ................. 83/802–806, 809–810, 83/813, 157, 471.3, 473, 477, 581, 477.1, 477.2; 144/363, 377, 379, 286.1, 287, 253.8, 250.18

(56) References Cited

U.S. PATENT DOCUMENTS

| | | | | | |
|---|---|---|---|---|---|
| 110,671 A | * | 1/1871 | Neeb | ............................. | 83/648 |
| 1,139,659 A | * | 5/1915 | Fox et al. | ................... | 83/471.1 |
| 2,274,923 A | * | 3/1942 | Hedgpeth | ..................... | 83/817 |
| 2,518,684 A | * | 8/1950 | Harris | ........................ | 83/471.1 |
| 2,663,331 A | * | 12/1953 | Herder | .................. | 144/250.18 |
| 2,695,637 A | * | 11/1954 | Ocenasek | ..................... | 83/814 |
| 2,711,762 A | * | 6/1955 | Gaskell | ...................... | 83/473 |
| 4,406,200 A | * | 9/1983 | Kerr | .............................. | 83/473 |
| 4,599,927 A | * | 7/1986 | Eccardt et al. | ................ | 83/473 |

FOREIGN PATENT DOCUMENTS

TW            274764            4/1996

* cited by examiner

*Primary Examiner*—Boyer D. Ashley
(74) *Attorney, Agent, or Firm*—Browdy and Neimark, P.L.L.C.

(57) ABSTRACT

An apparatus for adjusting the worktable of the band sawing comprising a base providing at the band sawing machine. Two turning pieces, each of which has a first guiding slot, a second guiding slot and a rack. The turning pieces fix at the bottom side of the worktable with the base locating between the turning pieces. A guiding shaft pivots at said base via the first guiding slots of the turning pieces. An adjusting shaft pivots at the base. Each end of said adjusting shaft respectively has a gear engaging with the racks of the turning pieces respectively. A pressing shaft pivots at the base via the second guiding slots of the turning pieces, and a locking member engages with the pressing shaft.

4 Claims, 4 Drawing Sheets

APPARATUS FOR ADJUSTING THE WORKTABLE OF THE BAND SAWING MACHINE

FIELD OF THE INVENTION

The present invention relates generally to a band sawing machine, and more particularly to an apparatus for adjusting the worktable of the band sawing machine.

BACKGROUND OF THE INVENTION

The Taiwan patent No. 274764 disclosed a conventional apparatus for adjusting the inclination degree of the worktable of the band sawing machine. The adjusting apparatus mainly comprises a positioning board, attaching on the lateral side of a machine body for a worktable fixed on the top end thereof. The positioning board further has a guiding rail and a guiding slot. The top side of the guiding slot has a rack. The positioning board pivots at the machine body by a bolt via the guiding slot and by a shaft via the guiding rail. An adjusting wheel disposes at the shaft having a teeth portion engaging with the teeth of the positioning board. A turning button provides at the shaft, and an elastic member provides at the shaft between the turning button and the adjusting wheel.

While turning loose the turning button, user can turn the adjusting wheel to drive the positioning board to turn whereby the worktable will be inclined at a predetermined angle. And then, turning the button tight to lock the adjusting wheel and the positioning board as well as keep the worktable at the predetermined angle.

In the above described prior art, there was only one positioning board disposed at the lateral side of the machine body. So the weights of the two opposite sides of the machine are different. That will affect the stable status of the band sawing machine. And the worktable is difficult to keep at the specific inclined angle while working.

SUMMARY OF THE INVENTION

The primary objective of the invention is to provide an apparatus for adjusting the worktable of the band sawing machine, which provided the worktable a stable status while working and adjusting.

According to the objective of the invention, the apparatus for adjusting the worktable of the band sawing comprising a base providing at the band sawing machine. Two turning pieces, each of which has a first guiding slot, a second guiding slot and a rack. The turning pieces fix at the bottom side of the worktable with base locating between the turning pieces. A guiding shaft runs through said base via the first guiding slots of the turning pieces. An adjusting shaft pivots at the base for free rotating. Each ends of the adjusting shaft respectively has a gear engaging with the racks of the turning pieces respectively. A pressing shaft runs through the base via the second guiding slots of the turning pieces, and a locking member engages with the pressing shaft.

DETAIL DESCRIPTION OF THE INVENTION

Figure 1:
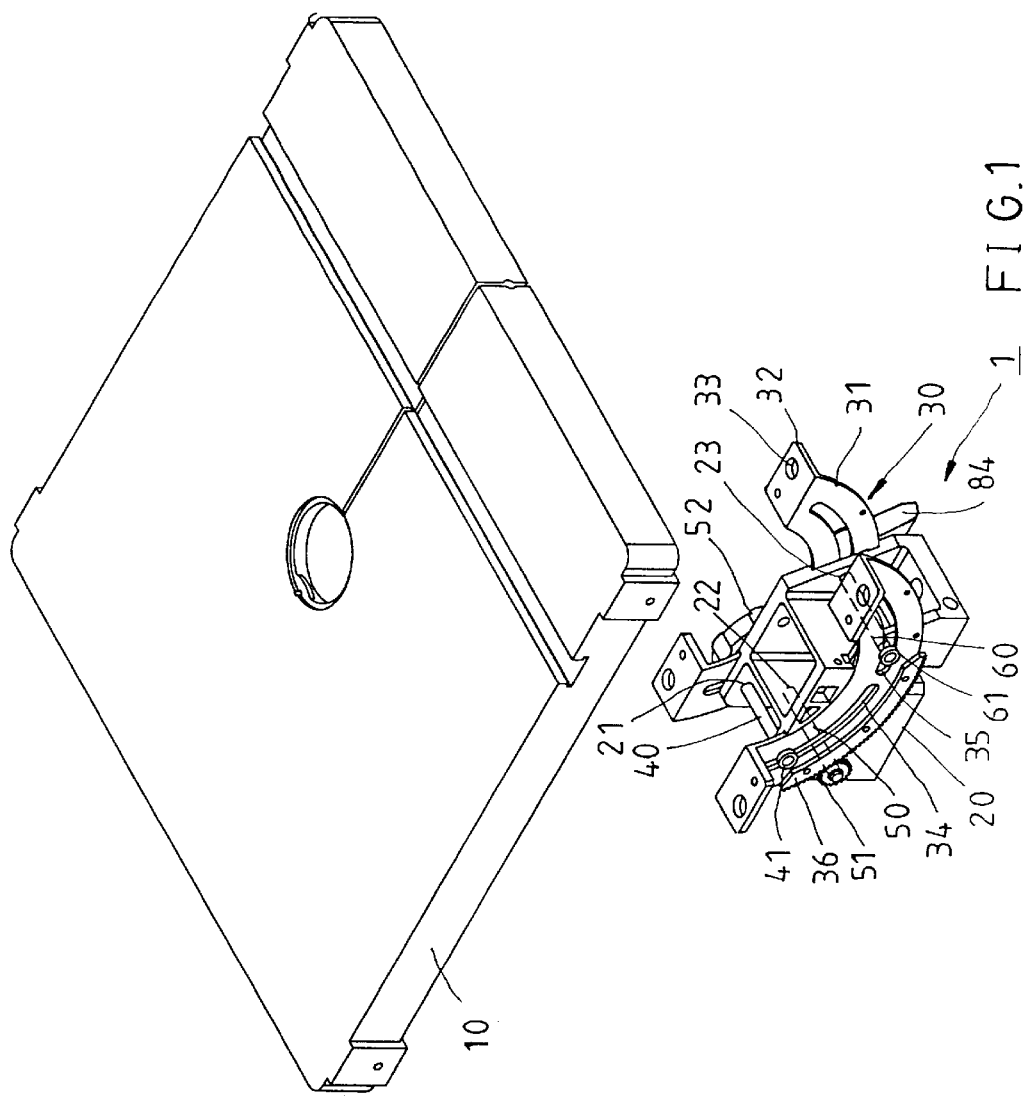
FIG. 1 shows the structure sketch of a prefer embodiment of present invention.
Figure 2:
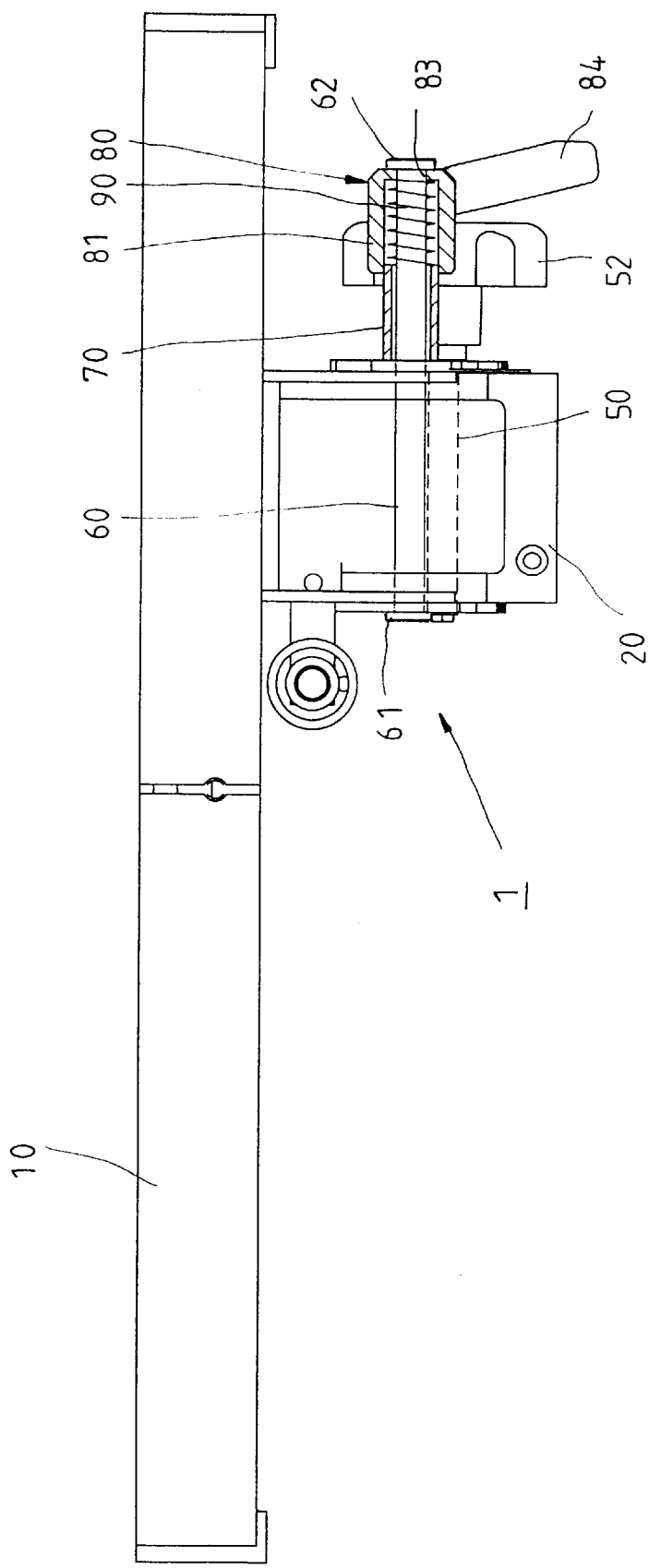
FIG. 2 is a front side view of FIG. 1.
Figure 3:
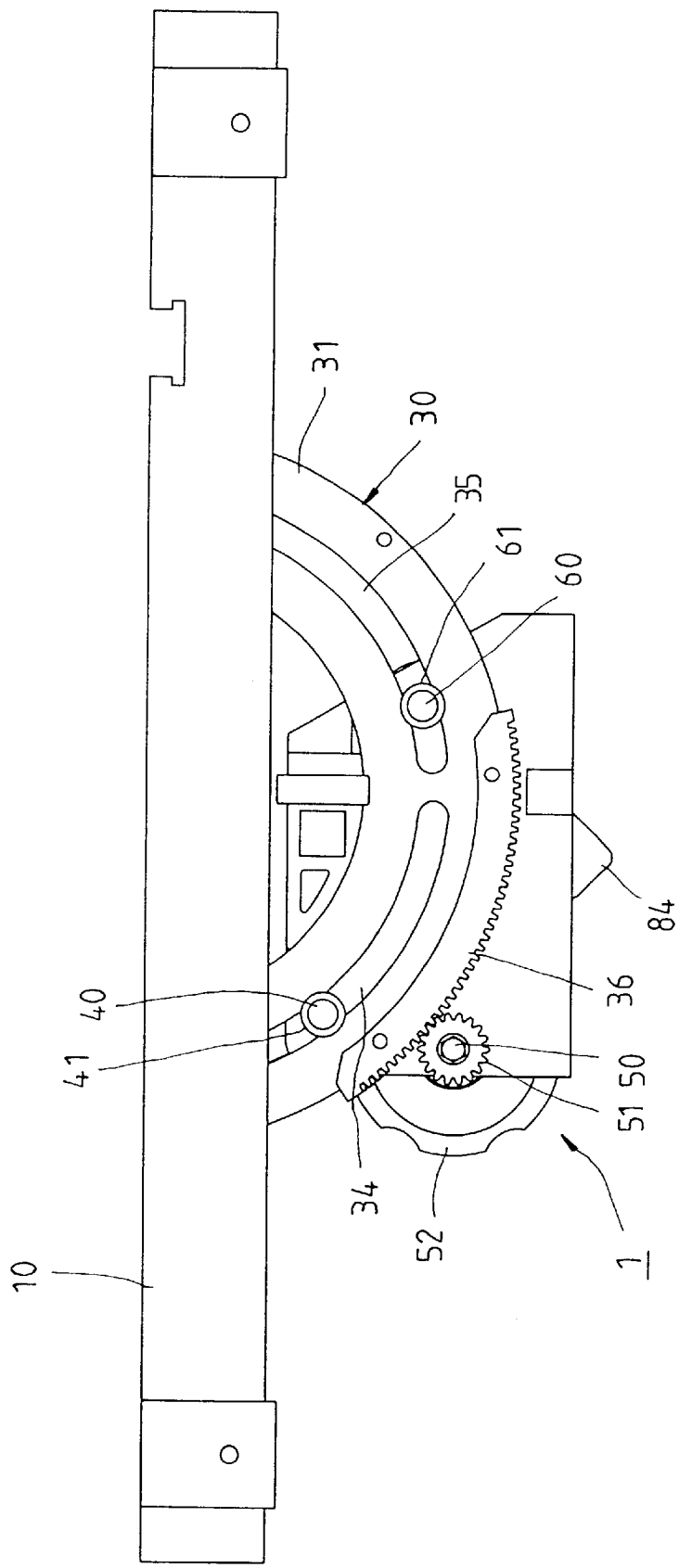
FIG. 3 is a left side view of FIG. 1.
Figure 4:
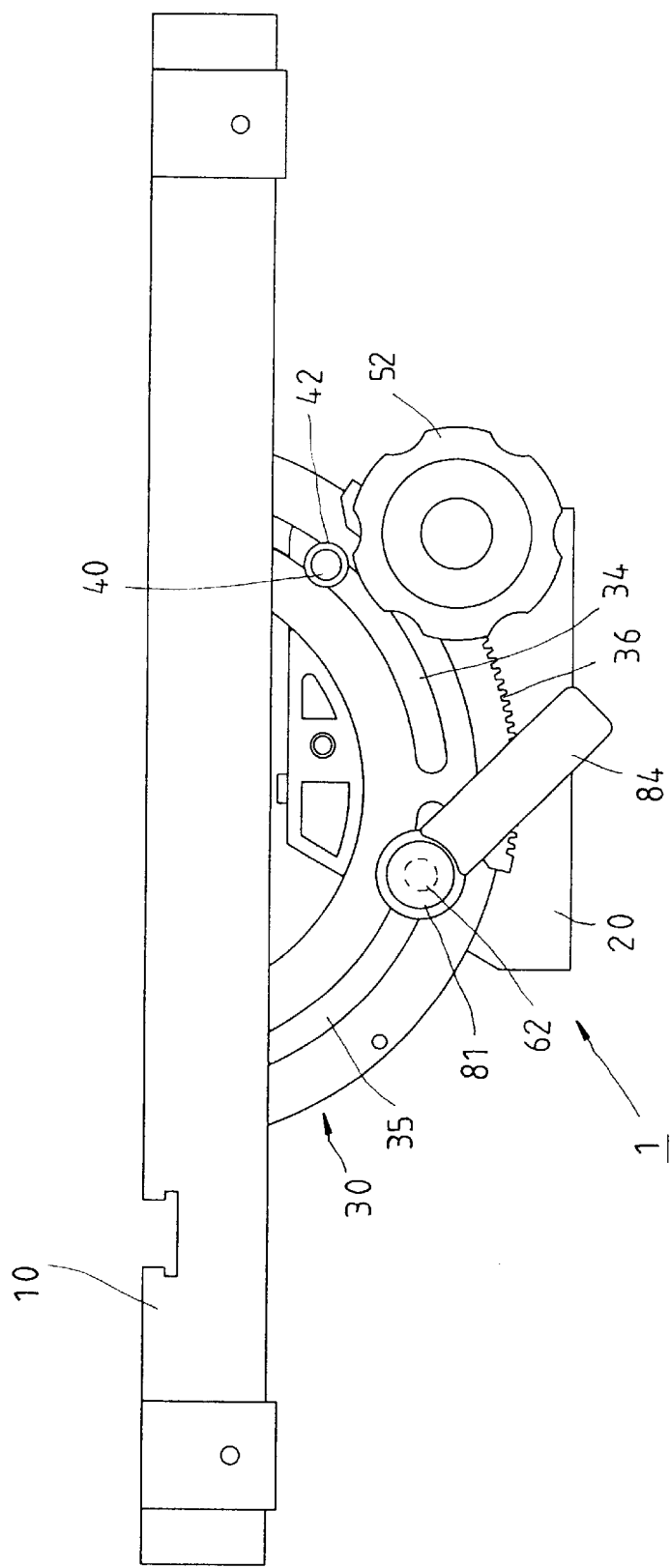
FIG. 4 is a right side view of FIG. 1.

Please refer to FIG. 1 to FIG. 4, a prefer embodiment of the present invention is to provide an apparatus 1 for adjusting the worktable of the band sawing machine, which comprises A base 20, which is a frame of rectangular shape, provides at the topside of a band sawing machine (not shown in FIG.). The base 20 has a first through hole 21 locating at the rear side thereof, a second through hole 22 locating at the rear side thereof below the first through hole 21, and a third through 23 locating at the front side thereof.

Two turning pieces 30, each of which has a semicircle arched main plate 31. The opposite ends of each main plate 31 are bended to the outer sides to form two against plates 32. Each against plate 32 of the turning pieces 30 has a hole 33 thereof. Each of the turning pieces 30 has an arched first guiding slot 34 locating at front side of the main plate 31, and an arched second guiding slot 35 locating at rear side of the main plate 31. Each turning pieces 30 further has a rack 34 providing at the bottom end of the main plate 31. The turning pieces 30 are fixed at the bottom side of a worktable 10 by four bolts (not shown) screwing into the worktable 10 via the holes 33 respectively. At that time, the turning pieces 30 are perpendicular to the worktable 10.

The base 20 disposes between the turning pieces 30 for the first through hole 21 of the base 20 being corresponding to the first guiding slots 34 of the turning pieces 30, and the third through hole 23 of the base 20 being corresponding to the second guiding slots 35 of the turning pieces 30.

A guiding shaft 40, which is a long bolt in the prefer embodiment of the present invention, receives in the first through hole 21 of the base 20 via the first guiding slots 34 of the turning pieces 30. The guiding shaft 40 has a head 341 at one end thereof lightly against at one of the turning pieces 30. A nut 42 engages with the guiding shaft 40 by the nut 42 lightly against at the other turning piece 30

An adjusting shaft 50 receives in the second through hole 22 of the base 20 for free rotating. Each of the opposite ends of the adjusting shaft 50 has a gear 51 engaging with the racks 36 of the turning pieces 30 respectively for driving the turning pieces 30 and the worktable 10 to turn when user turning the adjusting shaft 50. One end of the adjusting shaft 50, seeing FIG. 2, has a turning wheel 52 for facilitating user to turn the adjusting shaft 50. It is obvious to provide a second turning wheel (not shown) at the other end of the adjusting shaft 50. That will be the choice of the manufacturer.

A pressing shaft 60, receiving in the third through hole 23 of the base 20 via the second guiding slots 30 of the turning pieces 30. One end of the pressing shaft 60 has a stopping portion 61, seeing FIG. 2, being against at the outer side of the turning piece 30. The other end of the pressing shaft 60 has a blocking portion 62 and a thread closed to the blocking portion 62.

A locking member 70, which is a hexagonal pillar, has a thread hole 71 engaging with the thread of the pressing shaft.

A turning member 80, which has a socket seat 81, a hexagonal socket hole 82 providing at one end of the socket seat 81 and corresponding to the locking member 70, an opening 83 providing at the other end of the socket seat 81 connecting with the socket hole 82, and a handle 84 providing at outer side of the socket seat 81. The pressing shaft 60 receives in the socket hole 82 of the turning member 80 with the blocking portion 62 of the pressing shaft 60 locating at the outer side of the opening 83 of the turning member 80 for preventing the turning member 80 departing from the pressing shaft 60. Thus, the turning member 80 can move along the locking member 70 at a limited distance.

A spring 90, which disposes at the pressing shaft 60 with one end being against on the locking member 70 and the other end being against on the turning member 80. Thus, the initial position of the turning member 80 will be the turning member 80 being against on the blocking portion 62 of the pressing shaft 60. At this time, the socket hole 82 of the turning member 80 does not engage with the locking member 70 for preventing the locking member 70 being turned by unexpected force. When pressing the turning member 80, the socket hole 82 of the turning member 80 will engage with the locking member 70, then user can turn the turning member 80 to drive the locking member 70 to turn loose or to turn tight.

In operating, when turning loose the locking member 70 by pressing and turning the turning member 80, user can adjust the angle of inclination of the worktable 10 by turning the turning wheel 52 of the adjusting shaft 50. When the worktable 10 is turned to a decided inclination angle, user can turn tight the locking member 70 by pressing and turning the turning member 80 to fix the worktable 10.

The adjusting apparatus 1 of the present invention provides two turning pieces 30 to support the worktable 10 and provides two sets of the gears 51 and the racks 36 to drive the worktable 10 to turn. That will provided a stable status of the worktable 10 when working.

What is claimed is:

1. An adjustable worktable for a band sawing machine, comprising:

a band saw machine workpiece worktable;

a base provided below the band saw machine worktable;

two arc-shaped turning pieces affixed to a bottom side of the band saw machine worktable and wherein said base positioned between the two arc-shaped turning pieces, each of said turning pieces including a first arched guiding slot and a second arched guiding slot and a rack gear;

a guiding shaft extending through a hole in the base and into each of the first arched guiding slots of the turning pieces;

an adjusting shaft extending substantially parallel to the guiding shaft and through a second hole in the base such that two ends of the shaft terminate adjacent an outside periphery of the arc-shaped turning pieces; each of said two ends of the adjusting shaft including a pinion gear engaged with each of the rack gears of said turning pieces; one end of said two ends of the adjusting shaft including a turning wheel knob located on an outer side of the pinion gear such that a user can grasp the knob and rotate the knob thereby rotating the turning pieces and the worktable;

a pressing shaft extending substantially parallel to said guiding shaft and through a third hole in the base and into each of the second arched guiding slots of the turning pieces; the pressing shaft includes a threaded end adjacent a blocking portion and an opposing stopping portion end, said stopping portion end includes two engagement elements adjacent to and engageable with an outside portion of the turning pieces so as to squeeze the turning pieces;

a locking handle member positioned on the outside portion of the turning pieces and disposed around the pressing shaft; said handle member including a threaded hole engaged with the thread end of the pressing shaft such that when the user grasps and rotates the locking handle member the two engagement elements moved toward each other thereby pressing against the turning pieces to lock the band saw machine worktable in place.

2. The adjustable worktable as defined in claim 1, wherein the locking handle member is comprised of:

a hexagonal pillar including the thread hole engaged with the threaded end of the pressing shaft;

a turning member with a hexagonal socket seat hole corresponding to the hexagonal pillar on one end and an opening on the other end such that the pressing shaft extends through the opening thereby preventing the turning member from departing from the pressing shaft;

a handle provided at an outer side of the socket seat; and a spring disposed around the pressing shaft with one end against the turning member and the other end against the hexagonal pillar.

3. The adjustable worktable as defined in claim 1, wherein opposite ends of each of the arc shaped turning pieces includes an attachment flange; each of the attachment flanges includes a hole for receiving a bolt such that the turning pieces are attached to the worktable.

4. The adjustable worktable as defined in claim 1, wherein the guiding shaft is a bolt with a head at one end and a threads on the other end; a nut is provided to engage the threads on the bolt to hold the bolt on the turning pieces, wherein both the head and the nut are against outer sides of the turning pieces.

* * * * *